(12) United States Patent
Zhou et al.

(10) Patent No.: US 9,199,196 B2
(45) Date of Patent: *Dec. 1, 2015

(54) PROCESS FOR REMOVING NITROGEN OXIDES FROM GAS USING MICROWAVE CATALYTIC REACTION BY MICROWAVE CATALYSIS

(71) Applicant: XIANGTAN UNIVERSITY, Xiangtan (CN)

(72) Inventors: Jicheng Zhou, Xiangtan (CN); Zhe Wang, Xiangtan (CN); Pengfei Yang, Xiangtan (CN); Hongli Wang, Xiangtan (CN); Hu Li, Xiangtan (CN); Lingfei Gao, Xiangtan (CN); Meng Wang, Xiangtan (CN)

(73) Assignee: XIANGTAN UNIVERSITY, Xiangtan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,740

(22) Filed: Jun. 30, 2014

(65) Prior Publication Data

US 2014/0314649 A1    Oct. 23, 2014

Related U.S. Application Data

(63) Continuation-in-part of application No. PCT/CN2012/087342, filed on Dec. 24, 2012.

(30) Foreign Application Priority Data

Dec. 30, 2011  (CN) .......................... 2011 1 0451086
Dec. 30, 2011  (CN) .......................... 2011 1 0451134
Dec. 30, 2011  (CN) .......................... 2011 1 0451218
Dec. 30, 2011  (CN) .......................... 2011 1 0451237

(51) Int. Cl.
   *B01D 53/56*     (2006.01)
   *B01D 53/86*     (2006.01)
   *B01J 19/12*     (2006.01)
   *B01D 53/00*     (2006.01)

(52) U.S. Cl.
   CPC .......... *B01D 53/8628* (2013.01); *B01D 53/007* (2013.01); *B01D 53/8631* (2013.01); *B01J 19/126* (2013.01); *B01D 2255/2047* (2013.01); *B01D 2255/2065* (2013.01); *B01D 2255/2073* (2013.01); *B01D 2255/20707* (2013.01); *B01D 2255/20715* (2013.01); *B01D 2255/20723* (2013.01); *B01D 2255/20761* (2013.01); *B01D 2255/407* (2013.01); *B01D 2255/504* (2013.01); *B01D 2255/702* (2013.01); *B01D 2259/806* (2013.01); *B01J 2219/0875* (2013.01); *B01J 2219/0892* (2013.01)

(58) Field of Classification Search
   CPC ... B01D 53/007; B01D 53/8626; B01D 53/56
   See application file for complete search history.

(56) References Cited

U.S. PATENT DOCUMENTS

| 4,076,606     | A  * | 2/1978  | Suzuki et al.  | 204/157.3 |
| 2007/0297962  | A1 * | 12/2007 | Fanson et al.  | 423/213.2 |

FOREIGN PATENT DOCUMENTS

| DE | 19910553 C1 * | 7/2000 | ............. B01D 53/00 |
| WO | WO 0043106 A8 * | 4/2001 | ............. B01D 53/00 |
| WO | WO 2006083827 A2 * | 8/2006 | ............. B03C 11/00 |
| WO | WO 2006083827 A3 * | 4/2007 | ............. B01D 53/56 |

* cited by examiner

*Primary Examiner* — Timothy Vanoy
(74) *Attorney, Agent, or Firm* — Matthias Scholl, PC; Matthias Scholl

(57) ABSTRACT

A method for removing nitrogen-oxides by microwave assisted catalysis, including: 1) charging a catalyst capable of absorbing and interacting with microwave into a reaction tube of a reactor device, to form a reaction bed; and 2) heating the reaction bed by microwaves; when a temperature of the reaction bed is raised to 100-600° C., passing a gas containing nitrogen-oxides through the reaction bed, and performing a gas-solid reaction between the gas and the catalyst to remove the nitrogen-oxides from the gas.

17 Claims, No Drawings

PROCESS FOR REMOVING NITROGEN OXIDES FROM GAS USING MICROWAVE CATALYTIC REACTION BY MICROWAVE CATALYSIS

CROSS-REFERENCE TO RELATED APPLICATIONS

This application is a continuation-in-part of International Patent Application No. PCT/CN2012/087342 with an international filing date of Dec. 24, 2012, designating the United States, and further claims priority benefits to Chinese Patent Application No. 201110451237.8 filed Dec. 30, 2011, Chinese Patent Application No. 201110451086.6 filed Dec. 30, 2011, Chinese Patent Application No. 201110451134.1 filed Dec. 30, 2011, and Chinese Patent Application No. 201110451218.5 filed Dec. 30, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

This invention relates to a method for removing nitrogen-oxides from gas, particularly to a method for removing nitrogen-oxides from gas by microwave catalytic reaction by microwave catalysis or by microwave irradiation.

2. Description of the Related Art

Nitrogen-oxides $NO_x$ are the main pollutants which do a great harm to human health, and NO is 95% by weight of the nitrogen-oxides.

Typically, nitrogen-oxides are removed by selective catalytic reduction process in which ammonia is used as a reducer ($NH_3$-SCR process). The $NH_3$-SCR process is the most widely used method for removing nitrogen-oxides, and reaches a denitrification rate of 80-90% at a low temperature. However, for the $NH_3$-SCR process, the consumption of reducer is high, the catalyst is easy to be poisoned, the requirements for equipment are high, and the denitrification rate is low.

The NO decomposition process, which is cost-effective and does not require reducers such as $NH_3$, CO, and $CH_4$ and result in pollution, is considered as the most promising method. The decomposition reaction of NO is as follows: $2NO \leftrightarrow N_2 + O_2$. In theory, it is possible that the conversion rate of NO into $N_2$ and $O_2$ reaches 99%, but the activation energy is as high as 364 kJ/mol. Therefore, the key point of the NO decomposition process is to find out a suitable catalyst and an efficient energy to reduce the activation energy of the decomposition reaction of NO.

So far, Cu—ZSM-5 molecular sieve catalyst is the best catalyst for decomposing NO at a low temperature. The optimum activation temperature of the Cu—ZSM-5 molecular sieve catalyst is 450-550° C. However, the highest conversion rate of NO is about 70% because the activity of Cu—ZSM-5 molecular sieve catalyst is inhibited by oxygen. Modified Cu—ZSM-5 molecular sieve catalysts, such as Ce—Cu—ZSM-5, are less inhibited by oxygen, and the conversion rate of NO thereof is 75%. In conclusion, the NO decomposition process does not achieve a high denitrification rate, and is greatly influenced by oxygen.

SUMMARY OF THE INVENTION

In view of the above-described problems, it is one objective of the invention to provide a method for removing nitrogen-oxides by microwave assisted catalysis, which is efficient, energy-saving, cost-effective, and non-polluting.

In accordance with one embodiment of the invention, there is provided a method for removing nitrogen-oxides by microwave assisted catalysis. The method comprises:

1) charging a catalyst capable of absorbing microwaves into a reaction tube of a reactor, to form a reaction bed; and
2) heating the reaction bed by microwaves; when a temperature of the reaction bed is raised to 100-600° C., passing a gas containing nitrogen-oxides through the reaction bed, and performing a gas-solid reaction between the gas and the catalyst to remove the nitrogen-oxides from the gas.

The catalyst capable of absorbing microwaves comprises:
i) an active composition, comprising metal and/or metal-oxide, or activated carbon;
ii) a microwave absorbing composition, comprising CuO, ferrite spinel, or activated carbon; and
iii) a carrier.

The metal is selected from Cu, Mn, Ce, Ti, V, Zr, Mg, or Fe, and is preferably Cu; the metal-oxide is selected from the oxides of Cu, Mn, Ce, Ti, V, Zr, Mg, and Fe; and is preferably CuO.

The carrier has porous structures which are able to absorb microwaves; and is preferably activated carbon and/or molecular sieve.

The molecular sieve is ZSM molecular sieve, Y-type molecular sieve, or β-type molecular sieve; and is preferably ZSM-5 molecular sieve.

Preferably, the microwave absorbing composition is 10-70% by weight of the catalyst.

Preferably, the gas hourly space velocity of the gas is 1000-8000 $h^{-1}$.

Preferably, the frequency of microwave is 500-3000 MHz, is preferably 500-2350 MHz, and is more preferably 856-965 MHz.

Preferably, the residence time of the gas in the reaction bed is 0.5-10 s, and is preferably 1-6 s.

In accordance with one embodiment of the invention, the reaction bed is constituted of two reaction beds connected in series, which are the first reaction bed and the second reaction bed. The gas sequentially passes through the first reaction bed and the second reaction bed, reacts with a first catalyst in the first reaction bed to perform a decomposition reaction and reacts with a second catalyst in the second reaction bed to perform a selective reduction reaction. As a result, the nitrogen-oxides are removed.

In the above embodiment, the temperature of the first reaction bed is 250-550° C.; the residence time of the gas in the first reaction bed is 1-5 s; the temperature of the second reaction bed is 300-600° C.; the residence time of the gas in the second reaction bed is 1-6 s; the second catalyst comprises activated carbon as the carrier, and MnO, CuO, CeO—CuO, MgO—$FeO_x$, or CeO—$ZrO_2$ carried by activated carbon; and the first catalyst further comprises 10-70% by weight of CuO.

In the method for removing nitrogen-oxides by microwave assisted catalysis, when the temperature of the reaction bed is raised to 100-600° C., the nitrogen-oxides are most effectively removed. When the temperature is below 100° C., the activity of the catalyst is inhibited; when the temperature is above 600° C., the consumption of energy and the reducer is high.

In the method for removing nitrogen-oxides by microwave assisted catalysis, the gas hourly space velocity of the gas is 1000-8000 $h^{-1}$. When the gas hourly space velocity is below 1000 $h^{-1}$, the cost is high; when the gas hourly space velocity is above 8000 h$^{-1}$, the pressure drop of the reaction bed is high, and causes damage to the equipment.

In the method for removing nitrogen-oxides by microwave assisted catalysis, the frequency of the microwave is 500-3000 MHz, is preferably 500-2350 MHz, and is more preferably 856-965 MHz. When the frequency is below 500 MHz, the activity of the catalyst is inhibited; when the frequency is above 3000 MHHz, the consumption of energy and the reducer is high.

In the method for removing nitrogen-oxides by microwave assisted catalysis, when the catalyst contains activated carbon, the gas-solid reaction is a reduction reaction between activated carbon and nitrogen-oxides, and the products thereof are $N_2$ and $CO_2$; when the catalyst does not contain activated carbon, the gas-solid reaction is a decomposition reaction of nitrogen-oxides, and the products thereof are $N_2$ and $O_2$. Both the two reactions remove nitrogen-oxides.

The advantages of this invention lie in that:

1) the microwave assisted catalysis achieves a high conversion rate at a low temperature, and the gas can be treated even at a room temperature; the method is suitable for treating gas having either a low temperature or a high temperature; and the contents of oxygen and water in the gas do not influence the denitrification process; and
2) the denitrification rate is above 99%, the energy consumption is low, and the cost is low; and the method requires no reducer or little reducer.

DETAILED DESCRIPTION OF THE EMBODIMENTS

For further illustrating the invention, embodiments detailing a method for removing nitrogen-oxides by microwave assisted catalysis are described below. It should be noted that the following examples are intended to describe and not to limit the invention.

Some apparatus used in the examples are as follows:

1) muffle furnace and electric heating air-blowing drier obtained from Tianjin Taisite Instrument Corporation (Tianjin, China);
2) CPA series electric balance obtained from Sartorius Group (Germany);
3) AWL-1001-U water purification machine obtained from L&K Engineering Co., Ltd. (Taiwan);
4) DGG-9030B analytical pH meter obtained from Mettler-Toledo Instruments (Shanghai) Co., Ltd. (Shanghai, China);
5) catalysis reactor with conventional heating: MRT-6123 microreactor; and
6) 42C NO—$NO_2$—$NO_x$ gas analyzer made in US.

The gas to be treated is a mixture of $N_2$ and NO obtained from Dalian Date Gas Co., Ltd. (Dalian, China), wherein the content of NO is 1000 ppm.

EXAMPLE 1

Activated Carbon is Used as the Microwave Absorbing Composition and the Carrier

Charging 10 mL activated carbon into a reaction tube of a reactor. Controlling the reaction temperature, the content of oxygen, the gas hourly space velocity of NO, and the power of microwave to study the denitrification performance of activated carbon.

The results of the denitrification performance of activated carbon are shown in Table 1.

Conditions: the volume of activated carbon is 10 mL, the flow rate of the gas is 160 mL/min, the gas hourly space velocity of the gas is 1920 h$^{-1}$; the flow rate of oxygen is 10 mL/min, the content of oxygen is 5.88%, the content of NO in the influent is 1000 ppm.

TABLE 1

Influence of Reaction Temperature on Denitrification Performance of Activated Carbon

| No. | Reaction Temperature/ °C. | Content of NO in Outlet/ppm | Conversion Rate/% | Remark |
|---|---|---|---|---|
| 1 | 250 | 371 | 62.9 | |
| 2 | 400 | 75.0 | 92.5 | |
| 3 | 500 | 2.16 | 99.78 | |
| 4 | 600 | 1.81 | 99.82 | |
| 5 | 27 | 890 | 1 | Remark 1 |

Remark 1: The reduced NO is absorbed by activated carbon.

Conclusion: as the reaction temperature rises, the conversion rate of NO increases.

EXAMPLE 2

Mn is Used as the Active Composition, and Activated Carbon is Used as the Microwave Absorbing Composition and the Carrier Preparation of Catalyst:

preparing Mn/activated carbon (AC) by equi-volumetic impregnation method: adding 15 g activated carbon to a 100 mL breaker, measuring 20 mL de-ionized water by a cylinder, transferring the de-ionized water into a 50 mL breaker, and dissolving 1.03 g $MnCl_2$ in the de-ionized water; adding the $MnCl_2$ solution to activated carbon, stirring and vibrating for 2 h in a supersonic generator, impregnating for 12 h at a room temperature, drying for 12 h at 50° C. in a drying oven, and further drying for 12 h at 110° C. in the drying oven to obtain a Mn/AC catalyst having a Mn content of 3% (3% Mn/AC). Preparing Mn/AC catalysts having a Mn content of 5% (5% Mn/AC) and Mn/AC catalysts having a Mn content of 10% (10% Mn/AC) by the same process.

Reduction of NO:

charging 10 mL activated carbon into a reaction tube of a reactor, controlling the reaction temperature, the content of oxygen in the gas, and the content of Mn to study the denitrification performance of activated carbon modified by Mn.

(1) Influence of the content of oxygen on the denitrification performance of the Mn/AC catalyst is shown in Table 2.

Conditions: the volume of the 3% Mn/AC catalyst is 10 mL, the flow rate of the gas is 160 mL/min, the content of NO in the influent is 1000 ppm, and the temperature is 400° C.

TABLE 2

Influence of Oxygen Content on Denitrification Performance of Mn/AC

| No. | Flow Rate of Oxygen/ mL·min$^{-1}$ | Content of Oxygen/% | Content of NO in/% Outlet/ppm | Conversion Rate/% |
|---|---|---|---|---|
| 1 | 0 | 0 | 7.5 | 99.25 |
| 2 | 10 | 4 | 3.5 | 99.65 |

TABLE 2-continued

Influence of Oxygen Content on Denitrification Performance of Mn/AC

| No. | Flow Rate of Oxygen/ mL·min⁻¹ | Content of Oxygen/% | Content of NO in/% Outlet/ppm | Conversion Rate/% |
|---|---|---|---|---|
| 3 | 15 | 6 | 2.8 | 99.72 |
| 4 | 20 | 8 | 3.3 | 99.67 |

Conclusion: the content of oxygen in the gas does not influence the denitrification performance of the Mn/AC catalyst.

(2) Influence of the content of Mn on the denitrification performance of the Mn/AC catalysts is shown in Table 3.

Conditions: the volumes of the Mn/AC catalysts are 10 mL, the content of NO in the influent is 1000 ppm, the flow rate of the gas is 160 mL/min, the temperature is 400° C., and the contents of oxygen are 0 mL/min, 10 mL/min, 16 mL/min, and 25 mL/min respectively.

TABLE 3

Influence of Mn Content on Conversion Rate of Mn/AC

| Flow rate of Oxygen/mL/min | AC/% | 3% Mn/AC Catalyst/ % | 5% Mn/AC Catalyst/ % | 10% Mn/AC Catalyst/ % |
|---|---|---|---|---|
| 0 | 91.48 | 99.25 | 96.82 | 97.66 |
| 10 | 99.2 | 99.65 | 98.77 | 97.74 |
| 16 | 99.3 | 99.72 | 98.85 | 95.24 |
| 25 | 99.4 | 99.67 | 99.04 | 97.36 |
| Loss rate of Activated Carbon after 4 hours' reaction | 43.42% | 16.5% | 21.03% | 30.16% |

Conclusion: when the content of Mn is 3%, the denitrification performance is the best; and the loss rate of activated carbon in 3% Mn/AC is the lowest during a same period of time.

(3) Influence of the reaction temperature on the denitrification performance of the Mn/AC catalyst is shown in Table 4.

TABLE 4

Influence of Reaction Temperature on Denitrification Performance of Mn/AC

| No. | Reaction Temperature/° C. | Conversion Rate Achieved by 3% Mn/AC Catalyst/% | Conversion Rate Achieved by Activated Carbon/% |
|---|---|---|---|
| 1 | 250 | 76.96 | 62.90 |
| 2 | 300 | 84.08 | 75.70 |
| 3 | 350 | 91.03 | — |
| 4 | 380 | 99.12 | — |
| 5 | 400 | 99.65 | 92.50 |

Conclusion: the reaction temperature significantly influences the denitrification performance of the Mn/AC catalyst. When the Mn/AC catalyst having a Mn content of 3% is utilized, the conversion rate of NO is 99.12% at 380° C., and is 99.65% at 400° C. Activated carbon is not able to achieve a high conversion rate.

Contrast 1 Heating Activated Carbon by Conventional Methods (Electric Heating or Other Heating Methods Conducted by Heat Exchange)

Charging 10 g activated carbon into the reaction tube, filing the reaction tube with a gas having a NO content of 1000 ppm and an oxygen content of 5.88%. A reactor used by the conventional methods is MRT-6123 microreactor. Electrically heating the reaction tube, and recording the temperature of the center of the reaction bed by a thermocouple recorder. When the reaction temperatures are 250° C., 300° C., 400° C., 500° C., and 600° C. respectively, using gas bottles to collect outlets of the reaction tube. Analyzing the content of NO in the outlets by the gas analyzer. The results are shown in Table 5.

TABLE 5

Conversion Rate Achieved by Using Electric Heating

| Reaction Temperature/° C. | 250 | 300 | 400 | 500 | 600 |
|---|---|---|---|---|---|
| Conversion Rate of NO/% | 47.2 | 52.5 | 65.7 | 86.6 | 92.8 |
| Temperature of Outlet/° C. | 102 | 108 | 112 | 120 | 132 |

Conclusion: the higher the reaction temperature is, the higher the denitrification rate and the temperature of the outlet are.

The above examples show that:

(1) when the reaction temperature is 400° C., the volume of activated carbon is 10 mL, the flow rate of NO is 160 mL/min, the gas hourly space velocity is 1020 h⁻¹, the content of NO in the influent is 1000 ppm, the flow rate of oxygen is 10 mL/min, and the content of oxygen is 5.88%, the conversion rate of NO is 92.4%; compared to conversion rate of NO achieved by conventional heating methods, the conversion rate of NO achieved by microwave assisted catalysis is much higher;

(2) when activated carbon modified by Mn is used as the catalyst, the denitrification rate is 99.7% and the loss of activated carbon is significantly reduced; the activity of the Mn/AC catalyst is higher than that of activated carbon; and Mn is cheaper than V; and (3) when activated carbon is used as the reducer, the pollution caused by ammonia is prevented.

EXAMPLE 3

Cu is Used as the Active Composition, Activated Carbon is Used as the Microwave Absorbing Composition, and ZSM-5 is Used as the Carrier AC represents for activated carbon, the mass component of a composite catalyst is 30% AC+5% Cu—ZSM-5.

Conditions: the volume of activated carbon is 10 mL, the flow rate of the gas is 160 mL/min, the gas hourly space velocity is 1020 h⁻¹, the flow rate of oxygen is 10 mL/min (the content of oxygen is 5.88%), the content of NO in the influent is 1000 ppm.

Passing the gas through a reaction bed filled with the composite catalyst. The temperature of the reaction bed is 150-600° C., and is preferably 380-600° C.; and the residence time of the gas in the reaction bed is 1-5 s, and is preferably 1.5-4 s. The influence of the reaction temperature on the denitrification performance of the composite catalyst is shown in Table 6.

TABLE 6

Influence of Reaction Temperature on Denitrification Performance of Composite Catalyst

| No. | Reaction Temperature/ °C. | Content of NO in Outlet/ppm | Conversion Rate/% | Remarks |
|---|---|---|---|---|
| 1 | 250 | 235 | 76.5 | The conversion rate is 72% when AC is not included in the composite catalyst |
| 2 | 400 | 218 | 78.2 | |
| 3 | 500 | 200 | 80.0 | |
| 4 | 600 | 130.8 | 86.92 | |

Conclusion: as the reaction temperature raises, the conversion rate of NO increases; however, the increment of the conversion rate between 250° C. and 400° C. is not obvious.

EXAMPLE 4

The catalyst and experimental procedures are the same as those in Example 3. Study the influence of the oxygen content in the gas on the denitrification performance of the catalyst.

Conditions: the volume of the catalyst is 10 mL, the flow rate of the gas is 250 mL/min (the gas hourly space velocity is 1500 h$^{-1}$), the content of NO is 1000 ppm, and the reaction temperature is 400° C. The influence of the oxygen content in the gas on the denitrification performance of the catalyst is shown in Table 7.

TABLE 7

Influence of Oxygen Content on Denitrification Performance of Catalyst

| No. | Flow Rate of Oxygen/ mL•min$^{-1}$ | Content of Oxygen/% | Content of NO in Intlet/ppm | Content of NO in Outlet/ppm | Conversion Rate/% |
|---|---|---|---|---|---|
| 1 | 0 | 0 | 1000 | 282 | 71.8 |
| 2 | 10 | 4 | 1000 | 218 | 78.2 |
| 3 | 15 | 6 | 1000 | 29.8 | 97.02 |
| 4 | 20 | 8 | 1000 | 12.11 | 99.79 |

Conclusion: the increase of the oxygen content promotes the conversion rate of NO while increases the consumption of the activated carbon.

EXAMPLE 5

The catalyst and experimental procedures are the same as those in Example 3. Study the influence of the gas hourly space velocity on the denitrification performance of the catalyst.

Conditions: the volume of the catalyst is 10 mL, the reaction temperature is 400° C., the flow rate of oxygen is 10 mL/min (the content of oxygen is 5.88%), and the content of NO in the inlet is 1000 ppm. The influence of the gas hourly space velocity on the denitrification performance of the catalyst is shown in Table 8.

TABLE 8

Influence of Gas Hourly Space Velocity on Denitrification Performance of Catalyst

| No. | Flow Rate of Gas/ mL•min$^{-1}$ | Gas Hourly Space Velocity/h$^{-1}$ | Content of NO in Inlet/ppm | Content of NO in Outlet/ppm | Conversion Rate/% |
|---|---|---|---|---|---|
| 1 | 170 | 1020 | 1000 | 68.6 | 93.14 |
| 2 | 320 | 1920 | 1000 | 218 | 78.2 |
| 3 | 500 | 3000 | 1000 | 294 | 70.6 |

Conclusion: the conversion rate of NO reduces as the gas hourly space velocity increases.

EXAMPLE 6

The catalyst and experimental procedures are the same as those in Example 3. Study the influence of the power of microwave on the denitrification performance of the catalyst.

Conditions: the volume of the catalyst is 10 mL, the flow rate of the gas is 160 mL/min, the content of NO in the inlet is 1000 ppm, and the flow rate of oxygen is 12 mL/min. The influence of the power of microwave on the denitrification performance of the catalyst is shown in Table 9.

TABLE 9

Influence of Power of Microwave on Denitrification Performance of Catalyst

| No. | Power of Microwave/ W | Balance Temperature of Reaction Bed/° C. | Content of NO in Inlet/ ppm | Content of NO in Outlet/ ppm | Conversion Rate/% |
|---|---|---|---|---|---|
| 1 | 300 | 220 | 1000 | 99.1 | 90.09 |
| 2 | 500 | 300 | 1000 | 22.3 | 97.77 |
| 3 | 800 | 580 | 1000 | 3.59 | 99.64 |

Conclusion: the conversion rate of NO increases as the power of microwave increases.

EXAMPLE 7

The catalyst and experimental procedures are the same as those in Example 3. Study the influence of the water content on the denitrification performance of the catalyst.

Conditions: the flow rate of the gas is 160 mL/min, the reaction temperature is 400° C., the content of NO is 1000 ppm, the flow rate of oxygen is 10 mL/min, and the volume of the catalyst is 10 mL. Adding water to the catalyst before the reaction.

Before water is added, the volume and the weight of the catalyst are 10 mL and 6.67 g respectively; after water is added, the weight of the catalyst is 9.47 g. The weight of water is 2.8 g.

The influence of the water content on the denitrification performance of the catalyst is shown in Table 10.

TABLE 10

Influence of Water Content on Denitrification Performance of Catalyst

| No. | Weight of the Catalyst before Water is Added/g | Weight of the Catalyst after Water is Added/g | Water Content/% | Content of NO in Inlet/ppm | Content of NO in Outlet/ppm | Conversion Rate/% |
|---|---|---|---|---|---|---|
| 1 | 6.23 | 6.23 | 0 | 1000 | 218 | 78.2 |
| 2 | 6.67 | 9.47 | 34.02 | 1000 | 65.9 | 93.41 |

Conclusion: the conversion rate of NO increases as the water content increases.

EXAMPLE 8

The catalyst and experimental procedures are the same as that in Example 3. Study the influence of the reaction temperature of the bed on the temperature of the outlet.

Conditions: the volume of the catalyst is 10 mL, the flow rate of the gas is 160 mL/min, the content of NO is 1000 ppm, and the flow rate of oxygen is 12 mL/min. Adding water to the catalyst before the reaction. The influence of the reaction temperature of the bed on the temperature of the outlet is shown in Table 11.

TABLE 11

Influence of Temperature of Reaction Bed on Temperature of Outlet

| Temperature of Reaction Bed/° C. | Temperature of Outlet/° C. |
|---|---|
| 250 | 30 |
| 400 | 30 |
| 500 | 30 |
| 600 | 29.5 |

Conclusion: since the residence time of the gas in the reaction bed is short, the temperature of the outlet does not increase as the temperature of the reaction bed increases. The results show that microwave energy is completely used for the catalysis reaction and not used for heating the gas. Therefore, the microwave energy is not wasted at all.

EXAMPLE 9

The experimental procedures are the same as that in Example 3. The content of AC is different from that in Example 3. Study the influence of the content of AC on the denitrification performance of the catalyst.

Conditions: the volume of the catalyst is 10 mL, the flow rate of the gas is 160 mL/min, the content of NO is 1000 ppm, and the flow rate of oxygen is 10 mL/min. Adding water to the catalyst before the reaction. The influence of the reaction temperature of the bed on the temperature of the outlet is shown in Table 12.

TABLE 12

Influence of Content of AC on Denitrification Performance of Catalyst

| No. | Content of C/% | Content of NO in Inlet/ppm | Content of NO in Outlet/ppm | Conversion Rate/% | Remarks |
|---|---|---|---|---|---|
| 1 | 0 | 1000 | 272 | 72.8 | The temperature of Cu—ZSM-5 can be raised to 250° C. at most. |
| 2 | 20 | 1000 | 170.7 | 82.93 | |
| 3 | 30 | 1000 | 39.8 | 96.02 | |

Conclusion: the conversion rate of NO increases as the content of C increases. When the content of activated carbon is 30%, the conversion rate is 96.02%. The results show that the increase of the content of C promotes the conversion rate of NO.

Contrast 2

The power of microwave is continuously adjustable between 0 and 1000 W; and the frequency of microwave is 2400-2500 MHz. The quartz reaction tube is WG1/2.45-Φ5.4×54, having a length of 535 mm and an inner diameter of 10 mm.

The catalyst is charged into the quartz reaction tube to form a reaction bed. The gas to be treated is passed through the reaction bed to perform decomposition reaction of NO.

The weight of the catalyst is 4 g, and the mass ratio of Cu is 5%. The content of NO in inlet is 1000 ppm, the flow rate is 160 mL/min, and the content of oxygen is 5.88%. The powers of microwave are controlled to be at 120° C., 150° C., and 180° C., and the pressure is normal atmosphere. The conversion rates at different temperatures are shown in Table 13.

TABLE 13

Conversion Rates at Different Temperatures

| Catalyst | Temperature of Reaction Bed/° C. | Conversion rate of NO/% |
|---|---|---|
| Cu—ZSM-5 | 120 | 73.0 |
| | 150 | 79.0 |
| | 180 | 82.4 |

When the temperature of the reaction bed is 180° C., the conversion rate of NO is 82.4%. It shows that the Cu—ZSM-5 catalyst exhibits a high activity on the decomposition of NO at a low temperature.

EXAMPLE 10

The gas to be treated is a mixture of $N_2$ and NO obtained from Dalian Date Gas Co., Ltd. (Dalian, China), wherein the content of NO is 1000 ppm.

The power of microwave is continuously adjustable between 0 and 1000 W; the frequency of microwave is 2400-2500 MHz. The quartz reaction tube is WG1/2.45-Φ5.4×54, having a length of 535 mm and an inner diameter of 10 mm.

The catalyst is charged into the quartz reaction tube to form a reaction bed. The gas to be treated is passed through the reaction bed to perform decomposition reaction of NO.

The weight of the catalyst CuO—Cu—ZSM-5 is 5 g, and the mass ratios of Cu and CuO in CuO—Cu—ZSM-5 are 5%, and 40% respectively. The content of NO in inlet is 1000 ppm, the flow rate is 160 mL/min, and the content of oxygen is 5.88%. The powers of microwave are controlled to be at 180° C., 300° C., and 380° C., and the pressure is normal atmosphere. The conversion rates at different temperatures are shown in Table 14.

TABLE 14

Conversion Rates at Different Temperatures

| Catalyst | Temperature of Reaction Bed/° C. | Conversion rate of NO/% |
|---|---|---|
| CuO—Cu—ZSM-5 | 180 | 87.60 |
|  | 300 | 97.95 |
|  | 380 | 98.93 |

When the temperature of the reaction bed is 380° C., the conversion rate of NO is as high as 98.93%.

EXAMPLE 11

The conditions and experimental procedures are the same as that in Example 10, except for that: the temperature of the reaction bed is 300° C. and the oxygen content of the gas is controlled to specific values. The influence of oxygen content on the conversion rate of NO is shown in Table 15.

TABLE 15

Influence of Oxygen Content on Conversion Rate of NO

| Flow Rate of $O_2$/mL·min$^{-1}$ | Content of Oxygen/% | Conversion rate of NO/% | Conversion rate of NO into $NO_2$/% | Conversion rate of NO into $N_2$/% |
|---|---|---|---|---|
| 0 | 0 | 98.748 | 0.04 | 98.684 |
| 10 | 5.88 | 98.326 | 0.22 | 98.106 |
| 16 | 9.09 | 98.440 | 0.08 | 98.360 |
| 20 | 11.1 | 98.667 | 0.04 | 98.627 |

The content of NO in the inlet is 1000 ppm. When oxygen exists, the majority of NO changes into $N_2$; when the temperature of the reaction bed is 300° C., the conversion rate of NO is above 98%. The content of oxygen does not influence the denitrification activity of the catalyst.

EXAMPLE 12

The conditions and experimental procedures are the same as that in Example 10, except for that: the mass ratio of CuO in CuO—Cu—ZSM-5 is 50% and the powers of microwave are controlled to be 400 w and 600 w. The influence of the power of microwave on the conversion rate of NO is shown in Table 16.

TABLE 16

Influence of Power of Microwave on Conversion Rate of NO

| Power of Microwave/w | Conversion rate of NO/% | Conversion rate of NO into $NO_2$/% | Conversion rate of NO into $N_2$/% | Balance Temperature of Reaction Bed/° C. |
|---|---|---|---|---|
| 400 | 83.16 | 82.37 | 0.79 | 296 |
| 600 | 88.10 | 87.98 | 0.12 | 365 |

When the power of microwave is 600 w, the denitrification rate of NO is 88.1%, and the balance temperature of the reaction bed is 365° C.

Contrast 3

The gas to be treated is a mixture of $N_2$ and NO obtained from Dalian Date Gas Co., Ltd. (Dalian, China), wherein the content of NO is 1000 ppm.

The weight of Cu—ZSM-5 catalyst is 4 g, the mass ratio of Cu is 5%. The content of NO in the inlet is 1000 pm, the flow rate is 160 mL/min, and the content of oxygen is 5.88%. Performing decomposition reaction of NO on a MRT-6123 microreactor obtained from Beijing Xinhangdun Co., Ltd. (Beijing, China) by using conventional heating methods. The results of conversion rates achieved by conventional heating methods are shown in Table 17.

TABLE 17

Decomposition of NO by Electrical Heating

| Catalyst | Reaction Temperature/° C. | Conversion Rate of NO/% |
|---|---|---|
| Cu—ZSM-5 | 450 | 39.2 |
|  | 500 | 48.9 |
|  | 550 | 53.6 |
|  | 600 | 49.3 |

For electrical heating, the optimum reaction temperature is 550° C. and the highest conversion rate of NO is 53.6%. The conversion rate achieved by electrical heating does not meet the requirements of industrialization. In contrast, the conversion rate of NO achieved by microwave assisted catalysis is 82.4% when the reaction temperature is 180° C. (see Table 13).

Contrast 4

According to information known in the art, the highest denitrification rate of NO is 75%.

The optimum temperature range for Cu—ZSM-5 molecular sieve catalyst is between 450 and 550° C., and the highest conversion rate thereof is about 70%. The presence of oxygen inhibits the activity of the catalyst. Modified Cu—ZSM-5 molecular sieve catalysts, such as Ce—Cu—ZSM-5, are less inhibited by oxygen, and the conversion rate of NO thereof is 75% at a high temperature, such as 550° C.

As shown in Contrasts 3 and 4, the denitrification rate achieved by the method of this invention is as high as 98.93%, and is higher than that achieved by prior art. Therefore, the method of this invention effectively decomposes NO and denitrifies nitrogen-oxides.

EXAMPLE 13

The power of microwave is continuously adjustable between 0 and 1000 W; and the frequency of microwave is 2400-2500 MHz. The quartz reaction tube is WG1/2.45-φ5.4×54, having a length of 535 mm and an inner diameter of 10 mm. AC represents activated carbon.

The reaction bed is constituted of two reaction beds connected in series, which are the first reaction bed and the second reaction bed. The first catalyst in the first reaction bed is Cu—HZSM-5 or Mn/MgFe$_2$O$_4$; the second catalyst in the second reaction bed is MnO, CuO, CeO—CuO, MgO—FeO$_x$, or CeO—ZrO$_2$ carried by activated carbon. The gas sequentially passes through the first reaction bed and the second reaction bed, reacting with the first catalyst to perform a decomposition reaction and reacting with the second catalyst to remove the nitrogen-oxides.

In the first reaction bed, NO is decomposed.

The weight of the first catalyst CuO—Cu—ZSM-5 is 5 g, the mass ratios of Cu and CuO in CuO—Cu—ZSM-5 are 5% and 40% respectively. The flow rate of NO in the inlet is 160 mL/min, and the content of oxygen is 5.88%.

The power of microwave is controlled to be at 180° C., 300° C., and 380° C., and the pressure is normal atmosphere. The results are shown in Table 18.

TABLE 18

Influence of Temperature of Reaction Bed on Conversion Rate of NO

| No. | Temperature of Reaction Bed | Conversion Rate of NO/% |
|---|---|---|
| 1 | 180° C. | 87.60 |
| 2 | 300° C. | 97.95 |
| 3 | 380° C. | 98.93 |

Conclusion: when the temperature of the reaction bed is 380° C., the denitrification activity of CuO—Cu—ZSM-5 is high; the conversion rate of NO in the first reaction bed is 98.93%.

In the second reaction bed, NO is reduced.

Charging 10 mL activated carbon into the quartz reaction tube, studying the influence of oxygen content on the denitrification performance of activated carbon modified by Mn. The influence of oxygen content on the denitrification performance of Mn/AC catalyst is shown in Table 19.

Conditions: the volume of the 3% Mn/AC is 10 mL, the flow rate is 160 mL/min, the content of NO in the inlet is 10 ppm, and the reaction temperature is 400° C.

TABLE 19

Influence of Oxygen Content on Denitrification Performance of Activated Carbon Modified by Mn

| No. | Flow Rate of Oxygen/ mL·min$^{-1}$ | Content of Oxygen/% | Content of NO in Outlet/ppm | Conversion Rate/% |
|---|---|---|---|---|
| 1 | 0 | 0 | 7.5 | 99.25 |
| 2 | 10 | 4 | 3.5 | 99.65 |
| 3 | 15 | 6 | 2.8 | 99.72 |
| 4 | 20 | 8 | 3.3 | 99.67 |

Conclusion: the content of oxygen does not influence the denitrification performance of Mn/AC catalyst; after the gas passes through the second reaction bed, the conversion rate of NO is raised to 99.72%.

EXAMPLE 14

The experimental procedures are the same as those in Example 13. The temperature of the first reaction bed is 300° C. Study the influence of oxygen content on the conversion rate of NO, and the results are shown in Table 20.

TABLE 20

Influence of Oxygen Content on Conversion Rate of NO

| No. | Flow Rate of Oxygen/ mL·min$^{-1}$ | Content of Oxygen/% | Conversion Rate/% | Conversion Rate of NO into NO$_2$/% | Conversion Rate of NO into N$_2$/% |
|---|---|---|---|---|---|
| 1 | 0 | 0 | 98.748 | 0.04 | 98.684 |
| 2 | 10 | 5.88 | 98.326 | 0.22 | 98.106 |
| 3 | 16 | 9.09 | 98.440 | 0.08 | 98.360 |
| 4 | 20 | 11.1 | 98.667 | 0.04 | 98.627 |

The content of NO in the inlet is 1000 ppm. NO almost changes into N$_2$ in the presence of oxygen. The temperature of the reaction bed is 300° C., and the conversion rate of NO in the first reaction bed is above 98%. The content of oxygen does not influence the conversion rate of NO and, thus, the catalyst exhibits high anti-oxygen activity.

EXAMPLE 15

The experimental procedures are the same as those in Example 13. Charging 10 mL activated carbon into the quartz reaction tube or the second reaction bed. Study the influence of the temperature of reaction bed on the conversion rate of NO.

Conditions: the volume of the 3% Mn/AC catalyst is 10 mL, the flow rate is 160 mL/min, the content of NO in the inlet is 1000 ppm, and the reaction temperature is 400° C. The results are shown in Table 21.

According to the results in Table 21, the temperature of the reaction bed significantly influences the denitrification performance of the Mn/AC. When activated carbon is modified by 3% by weight of Mn, the conversion rates of NO are 99.12% and 99.65% at 380° C. and 400° C. respectively.

TABLE 21

Influence of Temperature of Reaction Bed on Conversion Rate of NO

| No. | Temperature of Reaction Bed/° C. | Conversion Rate Achieved by 3% Mn/AC/% | Conversion Rate Achieved by AC/% |
|---|---|---|---|
| 1 | 250 | 76.96 | 62.90 |
| 2 | 300 | 84.08 | 75.70 |
| 3 | 350 | 91.03 | — |
| 4 | 380 | 99.12 | — |
| 5 | 400 | 99.65 | 92.50 |

EXAMPLE 16

The experimental procedures are the same as those in Example 13.

Cu—ZSM-5 molecular sieve catalyst is used in the first reaction bed. The weight of the catalyst is 5 g, and the contents of Cu and CuO in CuO—Cu—ZSM-5 are 5% and 40% respectively. Controlling the temperature of the reaction bed to be 300° C.

3% Mn/AC is used in the second reaction bed.

The volume of the catalyst is 10 mL, the temperature of the reaction bed is 500° C.

Conditions: the flow rate of the gas is 160 mL/min, the gas hourly space velocity of the gas is 1920 h$^{-1}$; the flow rate of oxygen is 10 mL/min, the content of oxygen is 5.88%, the content of NO in the influent is 1000 ppm in the first reaction bed.

Table 22 shows that the two-stage reaction beds can be used to treat gas containing high content of nitrogen-oxides. After the gas passes through the first reaction bed, the conversion rate of NO is above 95%; after the gas passes through the second reaction bed, the conversion rate of NO is above 99%. The decomposition reaction of NO in the first reaction bed does not require a reducer. Therefore, a denitrification rate of above 99% is achieved while the consumption of reducer is low.

TABLE 22

Conversion Rates Achieved by Two-stage Reaction bed

| No. | Content of NO in Outlet of First Stage/ ppm | Conversion Rate of First Stage/% | Content of NO in Outlet of Second Stage/ ppm | Total Conversion Rate/% |
|---|---|---|---|---|
| 1 | 37.1 | 96.29 | 3.21 | 99.68 |
| 2 | 25.0 | 97.50 | 1.65 | 99.84 |
| 3 | 31.0 | 96.90 | 2.32 | 99.78 |
| 4 | 22.5 | 97.75 | 1.81 | 99.82 |
| 5 | 28.0 | 97.20 | 1.16 | 99.88 |

Examples 13-16 show that:

(1) the reaction bed in this invention is constituted of two reaction beds connected in series; the first catalyst which is used in the first reaction bed is Cu—ZSM-5 or Mn/MgFe$_2$O$_4$; the second catalyst which is used in the second reaction bed is MnO, CuO, CeO—CuO, MgO—FeO$_x$, or CeO—ZrO$_2$ carried by activated carbon; the gas to be treated sequentially passes through the first and second reaction beds to perform decomposition reaction and selective reduction reaction so that nitrogen-oxides are removed; the above two-stage reaction bed can be used to treat gas containing high content of nitrogen-oxides; after the gas passes through the first reaction bed, the conversion rate of NO is above 95%; after the gas passes through the second reaction bed, the conversion rate of NO is above 99%; the decomposition reaction in the first reaction bed does not require a reducer; and thus, a denitrification rate of above 99% is achieved while the consumption of reducer is low;

(2) in the second reaction bed, Mn/AC or activated carbon is used to reduce NO; and the total conversion rate of NO is close to 99.9%; and (3) the pollution caused by ammonia is prevented since activated carbon is used as the reducer.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for removing nitrogen-oxides from a gas, the method comprising:
  1) charging a catalyst capable of absorbing microwaves into a reaction tube of a reactor, to form a reaction bed; and
  2) heating the reaction bed by microwaves; when a temperature of the reaction bed is raised to 100-600° C., passing a gas containing nitrogen-oxides through the reaction bed, and performing a gas-solid reaction between the gas and the catalyst to remove the nitrogen-oxides from the gas.

2. The method of claim 1, wherein the catalyst capable of absorbing microwaves comprises:
  i) an active composition selected from the group consisting of metal, metal-oxide, a mixture of metal and metal-oxide, and activated carbon;
  ii) a microwave absorbing composition selected from the group consisting of CuO, ferrite spinel, and activated carbon; and
  iii) a carrier.

3. The method of claim 2, wherein the metal is selected from the group consisting of Cu, Mn, Ce, Ti, V, Zr, Mg, and Fe; and the metal-oxide is selected from the group consisting of oxides of Cu, Mn, Ce, Ti, V, Zr, Mg, and Fe.

4. The method of claim 2, wherein the carrier is selected from the group consisting of activated carbon, a molecular sieve, and a mixture thereof.

5. The method of claim 4, wherein the molecular sieve is selected from the group consisting of ZSM molecular sieve, Y-type molecular sieve, and β-type molecular sieve.

6. The method of claim 1, wherein the microwave absorbing composition is 10-70% by weight of the catalyst.

7. The method of claim 1, wherein a gas hourly space velocity of the gas is 1000-8000 h$^{-1}$.

8. The method of claim 1, wherein a frequency of the microwave is 500-3000 MHz.

9. The method of claim 1, wherein a residence time of the gas in the reaction bed is 0.5-10 s.

10. The method of claim 1, wherein the reaction bed comprises a first reaction bed and a second reaction bed connected in series.

11. The method of claim 10, wherein a temperature of the first reaction bed is 250-550° C.

12. The method of claim 10, wherein a residence time of the gas in the first reaction bed is 1-5 s.

13. The method of claim 10, wherein a temperature of the second reaction bed is 300-600° C.

14. The method of claim 10, wherein a residence time of the gas in the second reaction bed is 1-6 s.

15. The method of claim 10, wherein the catalyst in the first reaction bed is Cu—ZSM-5 or Mn/MgFe$_2$O$_4$.

16. The method of claim 10, wherein the catalyst in the second reaction bed comprises activated carbon, and a metal-oxide selected from the group consisting of MnO, CuO, CeO—CuO, MgO—FeO$_x$, and CeO—ZrO$_2$.

17. The method of claim 10, wherein the catalyst in the first reaction bed further comprises 10-70% by weight of CuO.

* * * * *